(12) United States Patent
Gradu et al.

(10) Patent No.: US 6,974,011 B2
(45) Date of Patent: Dec. 13, 2005

(54) DIRECTIONAL CLUTCH

(75) Inventors: Mircea Gradu, Wooster, OH (US);
Timothy Schlernitzauer, Canton, OH (US)

(73) Assignee: The Timken Company, Canton, OH (US)

( * ) Notice: Subject to any disclaimer, the term of this patent is extended or adjusted under 35 U.S.C. 154(b) by 19 days.

(21) Appl. No.: 10/745,426

(22) Filed: Dec. 22, 2003

(65) Prior Publication Data

US 2005/0133329 A1 Jun. 23, 2005

(51) Int. Cl.[7] .................. F16D 41/08; F16D 41/067
(52) U.S. Cl. .................. 192/38; 192/44; 192/85 AT
(58) Field of Search .................. 192/38, 44, 85 AT

(56) References Cited

U.S. PATENT DOCUMENTS

| | | | |
|---|---|---|---|
| 1,807,035 A | * | 5/1931 | Herman .................. 74/136 |
| 2,172,653 A | * | 9/1939 | Flogaus .................. 192/45 |
| 3,054,488 A | * | 9/1962 | General et al. .................. 192/44 |
| 4,114,478 A | * | 9/1978 | Clauss .................. 475/144 |
| 5,131,285 A | | 7/1992 | Weismann et al. |
| 5,638,929 A | * | 6/1997 | Park .................. 192/44 |
| 6,132,332 A | | 10/2000 | Yasui |
| 6,206,164 B1 | * | 3/2001 | Kurita .................. 192/223.2 |
| 6,244,965 B1 | | 6/2001 | Klecker et al. |

FOREIGN PATENT DOCUMENTS

| | | | | |
|---|---|---|---|---|
| JP | 10181376 A | * | 7/1998 | .......... B60K 23/08 |
| WO | 01112272 A1 | | 2/2001 | |
| WO | 0171215 A1 | | 9/2001 | |

* cited by examiner

Primary Examiner—Richard M. Lorence
(74) Attorney, Agent, or Firm—Polster, Lieder, Woodruff & Lucchesi, L.C.

(57) ABSTRACT

A bi-directional clutch permits the unidirectional transfer of torque between inner and outer races in either direction of rotation, depending on how the clutch is set. The outer race has a cylindrical raceway presented inwardly toward the inner race, whereas the inner race has recesses presented outwardly toward the raceway in the outer race. Each recess has ramps which converge and each contains a cylindrical roller. The rollers fit into pockets in a cage, with the fit being quite close so that the circumferential position of the cage relative to the inner race controls the position of the rollers in the recesses of the inner race. The inner race carries actuators which operate against the rollers in two different pockets, one to prevent the rollers from moving up the ramps presented in one circumferential direction and the other to prevent the rollers from moving up the ramps presented in the other circumferential direction.

18 Claims, 4 Drawing Sheets

DIRECTIONAL CLUTCH

STATEMENT REGARDING FEDERALLY SPONSORED RESEARCH OR DEVELOPMENT

Not Applicable

CROSS REFERENCE TO RELATED APPLICATIONS

Background of the Invention

This invention relates in general to clutches and, more particularly, to a directional clutch.

Clutches find widespread use in connecting and disconnecting rotating components in machinery and when used for that purpose assume a variety of configurations. One type of clutch serves to couple a driving component to a driven component when the driving component rotates in one direction, but not in the opposite direction, this being a simple one-way clutch. Typically, this type of clutch utilizes rolling elements which operate along convergent surfaces that are between the rotating components. When the driving component rotates in one direction it drags the rolling elements toward the convergence in the surfaces, and they become lodged between the surfaces, thus transferring torque from the driving component to the driven component. In the other direction, the rolling elements more or less float between the components, leaving one to rotate relative to the other. However, a one-way clutch, as its name implies, is unidirectional and is further incapable of operating in a neutral condition in which the rolling elements do not impart rotation in either direction.

DETAILED DESCRIPTION OF INVENTION

Figure 1:
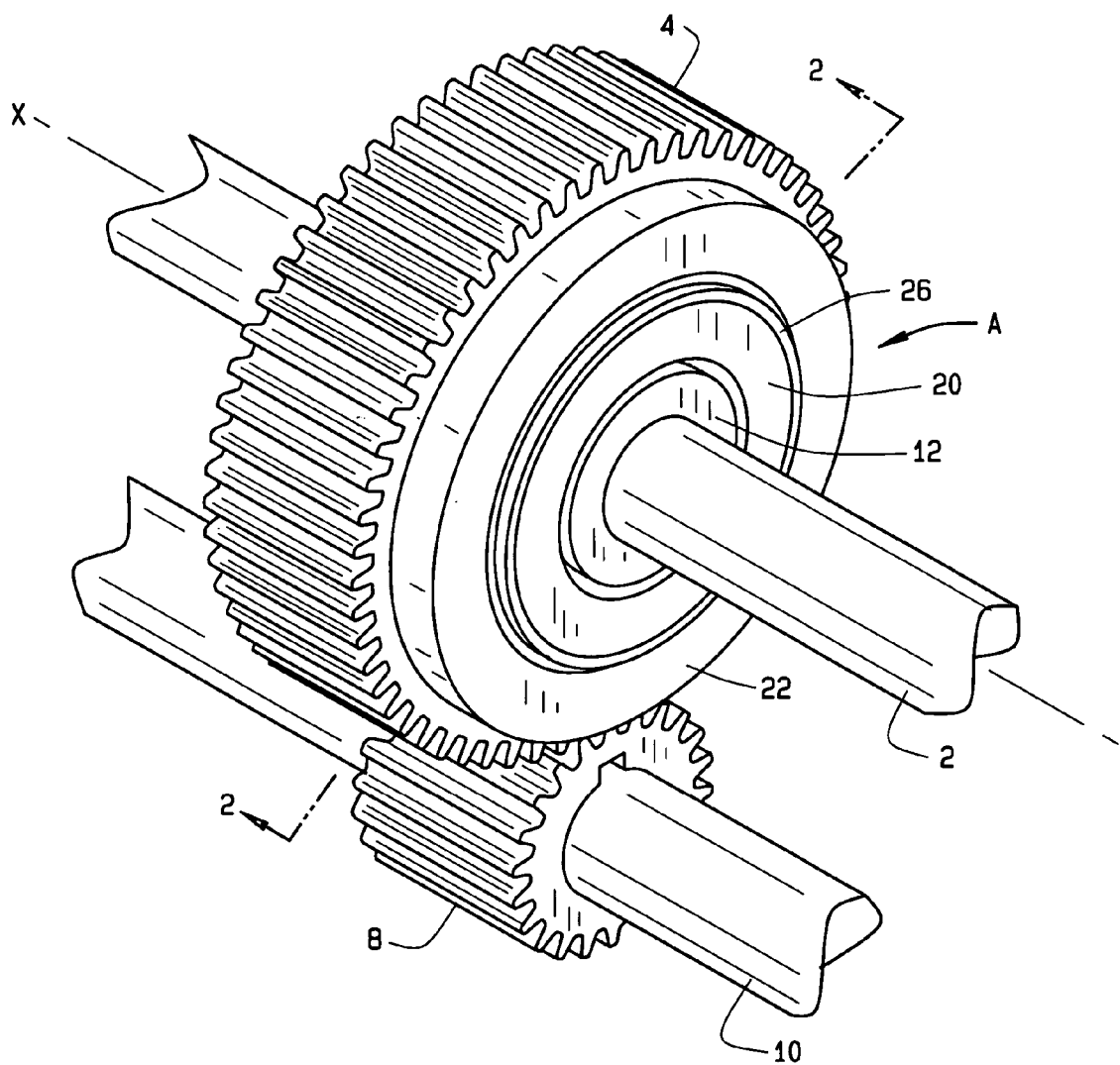
FIG. 1 is a perspective view of a clutch constructed in accordance with and embodying the presented invention, with the clutch being located between a shaft and a gear.
Figure 3:
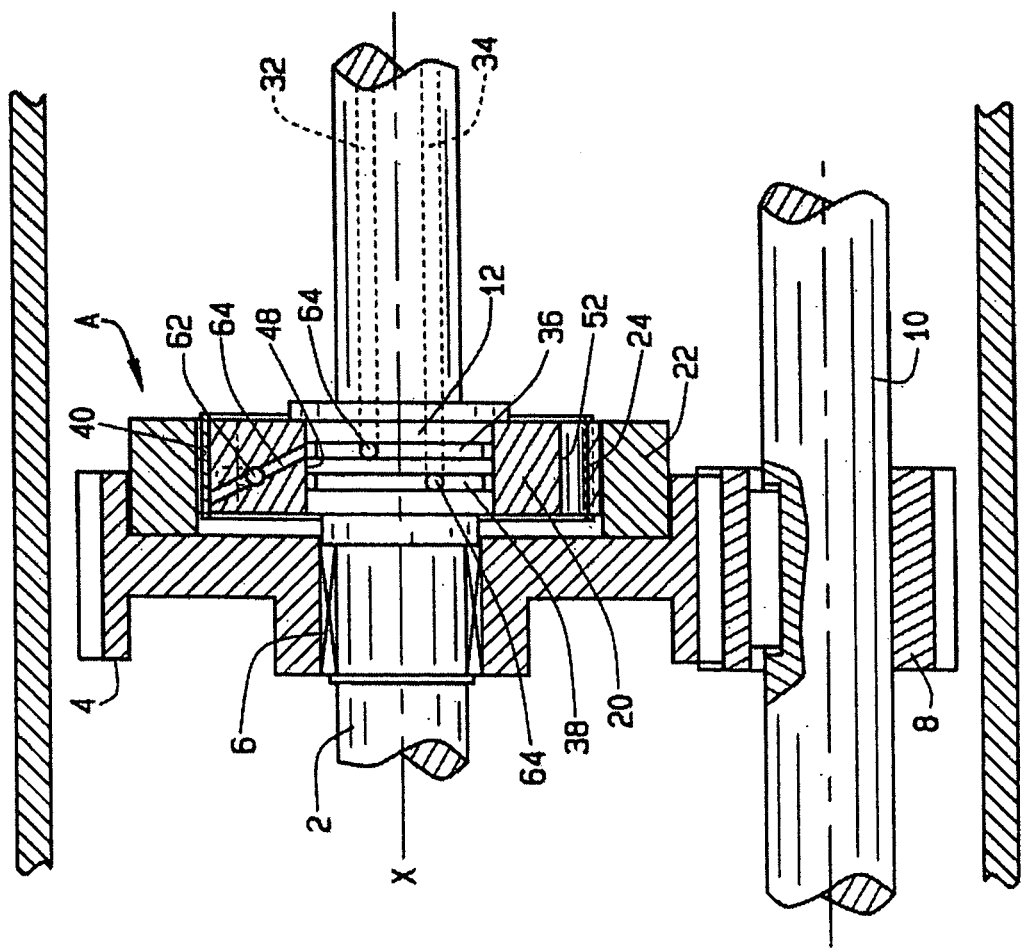
FIG. 3 is a longitudinal view taken along line 3—3 of FIG. 2.

Referring now to the drawings (FIG. 1), two machine components which rotate about a common axis are coupled through a clutch A. The one component may take the form of a shaft 2 and the other a gear 4 which is supported on the shaft 2 by a bearing 6 (FIG. 3). The gear 4 may mesh with a gear 8 on another shaft 10. Thus, torque applied to the shaft 2 is transferred to the shaft 10, provided the clutch A is engaged—indeed, engaged to transmit torque in the direction that the shaft 2 rotates under the torque applied to it. Actually, the clutch A will transmit torque in either direction of rotation, depending on how it is set, and in the direction opposite to the one in which torque is transmitted the clutch A will permit the gear 4 to free wheel on the shaft 2. The shaft 2 may have a raised seat 12 to which the clutch A is fitted. The clutch A is organized about an axis X about which it rotates, as do the shaft 2 and gear 4.

The clutch A includes (FIGS. 2 & 3) an inner race 20 which is attached firmly to the shaft 2 around the seat 12 on the shaft 2, an outer race 22 which is secured to the gear 4, rolling elements in the form of cylindrical rollers 24 located between the races 20 and 22, and a cage 26 in which the rollers 24 are confined. In addition, the clutch A has actuators 28 and 30 (FIG. 2) which control the direction that the clutch A transmits torque. The actuators 28, which are carried by the inner race 20, are hydraulically operated, with the hydraulic fluid required for their operation being supplied through the shaft 2. In this regard, the shaft 2 contains two oil passages 32 and 34 which extend axially through it and open outwardly into annular grooves 36 and 38 which are spaced axially from each other in the raised seat 12 of the shaft 2. The passage 32 supplies the fluid for operating the actuator 28, whereas the passage 34 supplies the fluid for operating the actuator 30.

The outer race 22 is the less complex of the two races 20 and 22. It is attached firmly to the gear 4 and has a cylindrical raceway 40 which is presented inwardly toward the axis X, its longitudinal centerline or axis corresponding to the axis X. The cylindrical raceway 40, which has its axis coincident with the axis X, surrounds the inner race 20 and is uninterrupted.

Figure 2:
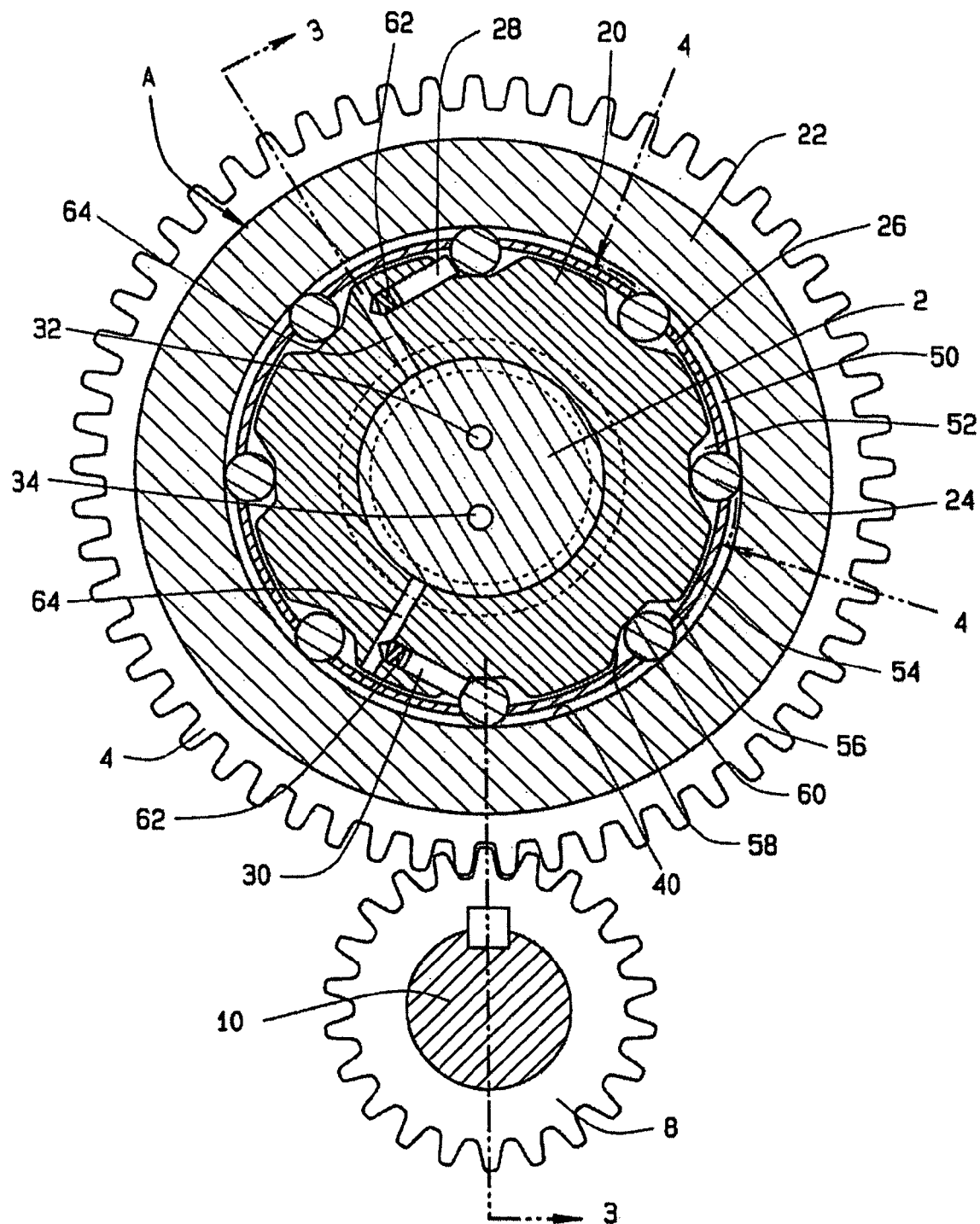
FIG. 2 is a transverse sectional view taken along line 2—2 of the FIG. 1.
Figure 4:
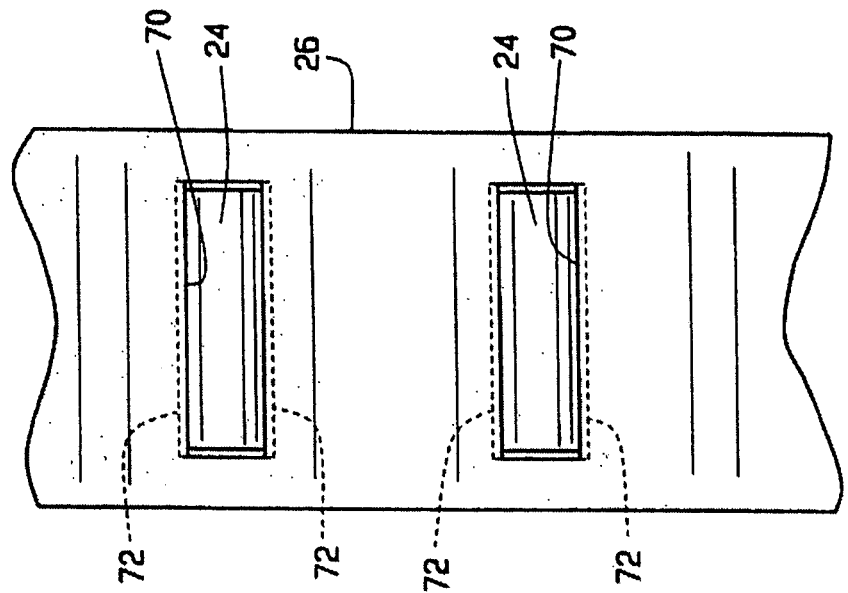
FIG. 4 is a fragmentary sectional view taken along the arc 4—4 of FIG. 2.
Figure 5:
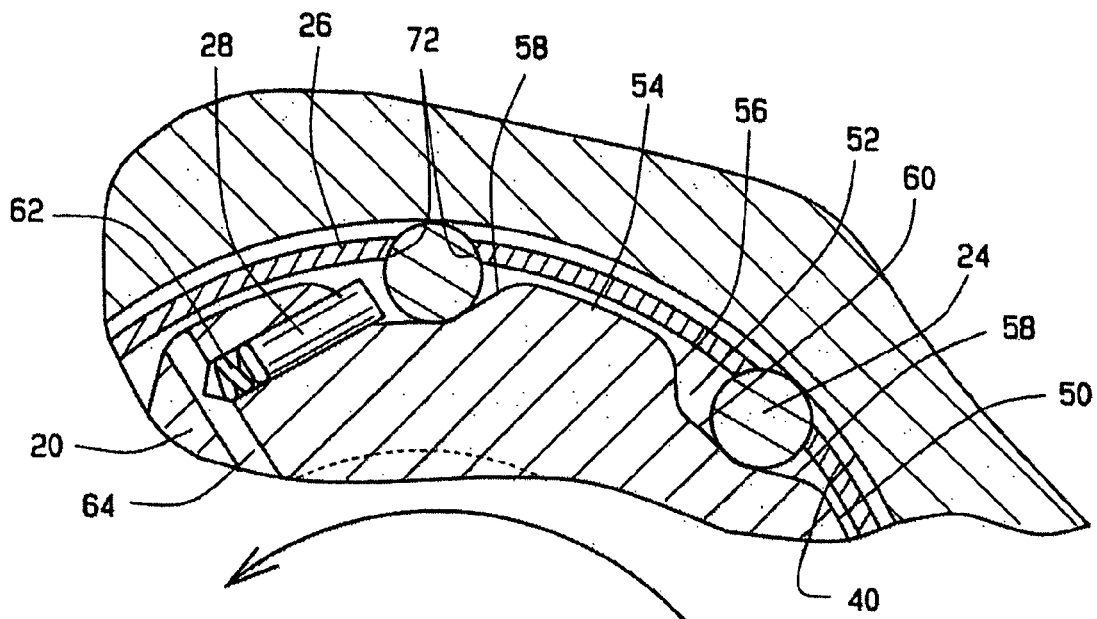
FIG. 5 is a fragmentary sectional view showing the orientation of the rollers when torque is transferred in one direction of rotation.
Figure 6:
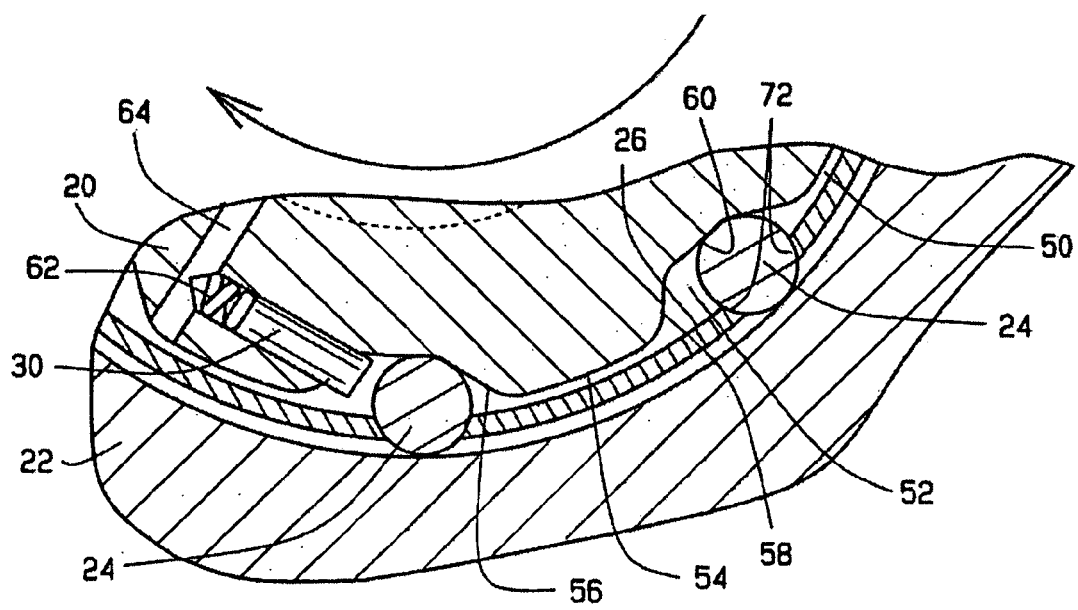
FIG. 6 is a fragmentary sectional view showing the orientation of the rollers when torque is transferred in the other direction of rotation.

The inner race 20 fits over the raised seat 12 (FIG. 2) of the shaft 2 to which it is secured firmly so that the shaft 2 and inner race 20 rotate as one. The inner race 20 has (FIGS. 2 & 3) an inner surface 48, which snugly contacts the outer surface of the raised seat 12 and isolates the two grooves 36 and 38 so that they are not in communication. The inner race 20 also has an undulated outer surface 50 containing a succession of recesses 52 located at equal circumferential intervals and lobes 54 between the recesses 52. Each recess 52 has two ramps 56 and 58 that converge toward a circumferentially extending intervening surface 60 at the bottom of the recess 52. Each ramp 56 and 58 lies oblique to the intervening surface 60 with which it merges and also oblique to the segment of the cylindrical raceway 40 that lies directly outwardly from it on the outer race 20. The ramps 56 of the recesses 52 are presented in one circumferential direction, and the ramps 58 in the other circumferential direction. Two of the recesses 52, located at 180° from each other, are slightly longer than the remaining recesses 52 and into each of those recesses 52 opens a cylindrical bore 62 (FIG. 2). The bore 62 from one of the recesses 52 opens out of the ramp 56 for that recess and toward the ramp 58 (FIG. 5). The bore 62 for the recess 52 located 180° away opens out of the ramp 58 of that recess 52 and toward the ramp 56 (FIG. 6). The bore 62 that opens out of the ramp 56 contains the actuator 28, whereas the bore 62 that opens out of the ramp 58 contains the actuator 30. The bore 62 that contains the actuator 28, at its opposite end, opens into a connecting passage 64 that extends inwardly and opens out of inner surface 50 where it aligns with the groove 36 in the raised seat 12 on the shaft 2. The bore 62 that contains the actuator 30, at its opposite end, opens into another connecting passage 64 that likewise opens out of the inner surface 50, but at a location that aligns with the other groove 38 in the raised seat 12. The arrangement is such that the bore 62 containing the actuator 28 communicates with the axial passage 32 in the shaft 2, whereas the bore 62 containing the actuator 30 communicates with the axial passage 34. Thus, an increase in the pressure of the fluid in the passage 32 will urge the actuator 28 farther into its recess 52, while an increase in the pressure of the fluid in the axial passage 34 will urge the actuator 30 farther into its recess 52 although from the opposite circumferential direction.

The rollers 24 occupy the recesses 52 of the inner race 20 and lie along the raceway 40 of the outer race 22 with their axes located parallel to the axis X (FIG. 2). They fit between the intervening surfaces 60 on the inner race 20 and the cylindrical raceway 40 of the outer race 22 with relatively little clearance. Unless the rollers 24 are otherwise restrained, rotation of the outer race 22 relative to the inner race 20 will drag the rollers 24 up the ramps 56 or 58, all in the direction of rotation, and cause the rollers 24 to lodge snugly between those ramps 56 or 58 and the raceway 40 of the outer race 22, thus imparting the rotation of the inner race 20 to the outer race 22 and of course, to the gear 4 on the shaft 10.

The cage 26 encircles the inner race 20 between the lobes 54 on the inner race 20 and the raceway 40 of the outer race 22. It contains pockets 70 which receive the rollers 24. The transverse edges of the pockets 70 are beveled to provide wings 72 that conform to the contour of the rollers 24 beyond the pitch circle connecting the axial centerlines of the rollers 24. The wings 72 enable the cage 26 to float, so to speak, on the complement of rollers 24, so that the cage 28 remains centered with respect to the axis X. The pockets 70 at their wings 72 are only slightly wider that the portions of the rollers 24 that are within them, so very little free motion exists circumferentially between the rollers 24 and the cage 26—indeed, just enough to permit the rollers 24 to rotate freely in the cage 26. The cage 26 also extends across the ends of the rollers 24—both ends—and is thereby prevented from drifting axially off the rollers 24. Thus, in either circumferential direction around the axis X the rollers 24 follow the cage 26 and vice versa.

Like any one-way clutch, the clutch A will transfer torque in one direction of rotation, but not the other, so the connected components can rotate freely with respect to each other in the opposite direction. But the clutch A enables one to change the direction of torque transfer or, in other words, it is bi-directional. The actuators 28 and 30 control the direction in which the clutch A transfers torque, and they do so by positioning the cage 26 such that it allows the rollers 24 to move relative to the inner race 20 in only one circumferential direction. As a consequence, the rollers 24 can move up only the ramps 56 or the ramps 58, depending on which actuator 28 or 30 is extended.

For example, if one desires to transfer rotation of the shaft 2 to the gear 4 when the shaft 2 rotates clockwise (reference being to FIG. 2), but not when the shaft 2 rotates counterclockwise, or not when gear 4 overruns the shaft 2 at greater velocity, the pressure in the axial passage 32 of the shaft 2 is increased, while the pressure in the axial passage 34 is relaxed. This extends the actuator 28 farther into its recess 52 (FIG. 5). It advances toward the ramp 58 of that recess 52, urging the roller 24 of the recess 52 away from the ramp 56. Indeed, it prevents the roller 24 from approaching the ramp 56 but not the ramp 58. Since all of the rollers 24 are confined somewhat closely in their respective pockets 70 of the cage 26, the remaining rollers 24 are likewise prevented from approaching the ramps 56 of their pockets 70. The rollers 24 tend to remain with the outer race 22 and as a consequence move toward and up the ramps 58. Indeed, they become lodged between the cylindrical raceway 40 of the outer race 22 and the ramps 58 of the inner race 20 and thus transfer torque from the inner race 20 to the outer race 22. The outer race 22, accordingly, rotates with the inner race 20 at the same angular velocity, all under the torque exerted by the inner race 20. Should the shaft 2 rotate counterclockwise or should the gear 4 overrun the shaft 2 in clockwise rotation at a greater angular velocity, the rollers 24 will simply drift away from the ramps 58 to the intervening surfaces 60 of their respective recesses 52. However, the actuator 30 will prevent the roller 24 in its recess 52 from approaching the ramps 56 of that recess 52, and the cage 26 will prevent the remaining rollers 24 from approaching the ramps 56 of their recesses 52, so the reversal of the shaft 2 or the free wheeling of the gear 4, disconnects the shaft 2 rotationally from the gear 4.

On the other hand, if one wants to transfer torque from the shaft 2 to the gear 4 when the shaft 2 rotates counterclockwise (reference being to FIG. 2), the pressure in the passage 34 is increased, while the pressure in the passage 32 is relaxed. The actuator 30 extends and the actuator 28 retracts (FIG. 6). Thus the rollers 24 are prevented from approaching the ramps 58, but not the ramps 56, and will lodge between the ramps 56 and the cylindrical raceway 40 of the outer race 22 to transfer torque from the inner race 20 to the outer race 22 in the counterclockwise direction. The gear 4 thus rotates counterclockwise. Of course, if the shaft 2 changes direction, when the inner race 20 is in that configuration, or the gear 4 overruns the shaft 2, no torque will transfer between the shaft 2 and gear 4.

By pressurizing the fluid in both passages 32 and 34 of the shaft 2 such that both actuators 28 and 30 extend into their respective recesses 52 approximately the same distance, the rollers 24 in those recesses 52, and by reason of the cage 26, the remaining rollers 24 as well, are brought to a neutral position in which they cannot approach either the ramps 56 or the ramps 58 (FIG. 2). They remain centered on the intervening surfaces 60. In this condition the inner race 20 can rotate in either direction of rotation relative to the outer race 22 and vice versa. In effect, the shaft 2 is disconnected rotationally from the gear 4.

Variations are possible. For example, the rolling elements need not be cylindrical, but instead may be spherical (balls) or spherical rollers or even tapered rollers in which event the raceways 40, the ramps 56 and 58, and the intervening surfaces 60, should be configured to conform to the rolling elements. Also, the actuators 28 and 30 may project into the same recess 52 and operate against a single roller 24. Moreover, the actuators for positioning the cage may take a different form, and may even be connected directly to the cage 26, instead of operating through two of the rollers 24. Furthermore, the clutch A may have only the actuator 28, in which event it controls torque in only one direction, but provides a neutral condition.

What is claimed is:

1. A directional clutch for transferring torque about an axis of rotation, said clutch comprising:

an outer race having a circumferentially extending raceway located around the axis, the raceway being uninterrupted in the circumferential direction;

an inner race having recesses that are spaced circumferentially around the axis and open toward the raceway on the outer race, each recess having a first ramp and a second ramp which converge, the first ramps of the recesses being presented in one circumferential direction and the second ramps being presented in the other circumferential direction;

rolling elements in the recesses of the inner race and along the raceway of the first outer race;

a cage having pockets which receive the rolling elements such that the circumferential position of the cage relative to the second race controls the positions of the rolling elements in the recesses; and an actuator that moves relative to the inner race and operates through a rolling element to control the circumferential position of the cage and other rolling elements relative to the inner race.

2. A clutch according to claim 1 wherein the actuator is one of two actuators, there being first and second actuators; and wherein the first actuator restricts movement of the cage such that the rolling elements are prevented from moving up the first ramps and the second actuator restricts movement of the cage such that the rolling elements are prevented from moving up the second ramps.

3. A clutch according to claim 2 wherein the actuators are carried by the inner race.

4. A clutch according to claim 3 wherein the first actuators project into one of the recesses from the first ramp of that recess and the second actuator projects into one of the recesses from the second ramp of that recess.

5. A clutch according to claim 4 wherein the actuators project into different recesses.

6. A clutch according to claim 5 wherein the inner race contains bores which open into the recesses in which the actuators operate and the actuators are received in the bores.

7. A clutch according to claim 6 wherein the inner race contains connecting passages that communicate with the bores behind the actuators in those bores, whereby varying the pressure of fluid in the connecting passages will move the actuators in the bores.

8. A clutch according to claim 7 in combination with a shaft containing first and second fluid passages, wherein the inner race is mounted on the shaft; wherein the connecting passage that communicates with the bore containing the first actuator also communicates with the first passage in the shaft; and wherein the connecting passage that communicates with the bore containing the second actuator also communicates with the second passage in the shaft.

9. A clutch according to claim 1 wherein the inner race contains a bore which opens into one of the recesses; and the actuator is in the bore where it aligns with the rolling element in said one recess; and wherein a fluid, the pressure of which may be controlled, is in the bore behind the actuator.

10. A clutch according to claim 1 wherein the outer race surrounds the second race.

11. A clutch according to claim 1 wherein the raceway on the outer race is cylindrical and the rolling elements are cylindrical rollers.

12. A clutch according to claim 1 wherein each recess also has an intervening surface located between its first and second ramps and extending generally circumferentially.

13. A clutch according to claim 1 wherein the cage along the rolling elements has wings which conform generally to the contour of the rolling elements radially beyond the centers of the rolling elements.

14. A directional clutch according to claim 13 wherein the outer race extends around the inner race; wherein the second race has lobes between its recesses; and wherein the cage extends over the lobes, radially beyond the lobes.

15. A bi-directional clutch for transferring torque about an axis, said clutch comprising:

an outer race having an uninterrupted, circumferentially extending, raceway presented inwardly toward the axis;

an inner race located within the outer race and having recesses that open outwardly toward the raceway on the outer race, each recess having first and second ramps which converge inwardly toward the axis, the first ramps being presented in one circumferential direction and the second ramps being presented in the opposite circumferential direction;

rolling elements located in the recesses and along the raceway of the outer race such that relative rotation between the inner and outer races in one circumferential direction will cause the rolling elements to move toward the first ramps and relative rotation in the other circumferential direction will cause the rolling element to move toward the second ramps;

a cage having pockets in which the rolling elements are received such that the circumferential position of the cage relative to the inner race controls the position of the rolling elements in their recesses; and actuators carried by the inner race and operable against at least one of the rolling elements to position the cage in a first position in which the rolling elements are prevented from moving up the first ramp and in a second position in which the rolling elements are prevented from moving up the second ramps.

16. A clutch according to claim 15 wherein the actuators operate against different rolling elements.

17. A clutch according to claim 16 wherein the inner race contains a first bore that opens into one of the recesses and a second bore that opens into another of the recesses; wherein one of the actuators is in the first bore and another one of the actuators is in the second bore; and wherein the bores behind the actuators contain a fluid that may be pressurized to displace the actuators in the bores.

18. A clutch according to claim 15 wherein the raceway on the outer race is cylindrical and the rolling elements are cylindrical rollers.

* * * * *

UNITED STATES PATENT AND TRADEMARK OFFICE
CERTIFICATE OF CORRECTION

PATENT NO. : 6,974,011 B2
DATED : December 13, 2005
INVENTOR(S) : Mircea Gradu and Timothy Schlernitzauer It is certified that error appears in the above-identified patent and that said Letters Patent is hereby corrected as shown below:

Column 3,
Line 34, after "versa." insert -- Should the wings 72 experience excessive wear and enlarge the pockets 70, the lobes 54 on the inner face 20 will still maintain the cage 26 in a generally centered position around the inner race 20. --.

Column 4,
Line 65, delete "first".

Signed and Sealed this

Seventh Day of March, 2006

JON W. DUDAS
*Director of the United States Patent and Trademark Office*